US011022586B2

(12) United States Patent
Stanley et al.

(10) Patent No.: US 11,022,586 B2
(45) Date of Patent: Jun. 1, 2021

(54) MULTI-COLUMN SEPARATION APPARATUS AND METHOD

(71) Applicant: National Nuclear Laboratory Limited, Warrington Cheshire (GB)

(72) Inventors: Steven J. Stanley, Lancaster (GB); Thomas O. Myers, Leeds (GB)

(73) Assignee: National Nuclear Laboratory Limited, Warrington Cheshire (GB)

( * ) Notice: Subject to any disclaimer, the term of this patent is extended or adjusted under 35 U.S.C. 154(b) by 0 days.

(21) Appl. No.: 15/113,075

(22) PCT Filed: Jan. 21, 2015

(86) PCT No.: PCT/GB2015/050130
§ 371 (c)(1),
(2) Date: Jul. 21, 2016

(87) PCT Pub. No.: WO2015/110806
PCT Pub. Date: Jul. 30, 2015

(65) Prior Publication Data
US 2017/0023535 A1   Jan. 26, 2017

(30) Foreign Application Priority Data
Jan. 21, 2014 (GB) .................................. 1401010

(51) Int. Cl.
*G01N 30/46* (2006.01)
*B01L 3/00* (2006.01)
(Continued)

(52) U.S. Cl.
CPC .......... *G01N 30/461* (2013.01); *B01D 15/22* (2013.01); *B01L 3/502715* (2013.01);
(Continued)

(58) Field of Classification Search
None
See application file for complete search history.

(56) References Cited

U.S. PATENT DOCUMENTS 4,092,398 A   5/1978  Miyake et al.
4,732,687 A * 3/1988  Muller ............... G01N 30/6069
                                                    210/198.2
(Continued)

FOREIGN PATENT DOCUMENTS

CN   103007576 A   4/2013
CN   103301654 A   9/2013
(Continued)

OTHER PUBLICATIONS

Cadieux, J.R. et al. Separation and Analysis of Actinides by Extraction Chromatography Coupled with Alpha-Particle Liquid Scintillation Spectrometry, 1996, Radioacitivy & Radiochemistry, vol. 7(2), pp. 30-34.*

*Primary Examiner* — Xiaoyun R Xu
(74) *Attorney, Agent, or Firm* — E. Eric Mills; Nexsen Pruet, PLLC

(57) ABSTRACT

The invention provides an apparatus and system for the separation and optional analysis of the components of a sample of material, the apparatus and system comprising a cartridge comprising: at least one sample inlet port, at least one resin inlet port and a multiplicity of reagent and purge fluid input ports which are fluidically connected via a multiplicity of control valves to a multiplicity of chromatographic columns which are fluidically connected together in series; and a multiplicity of outlet ports wherein each outlet port additionally comprises an outlet valve which is adapted to control the flow of fluid through said outlet ports; wherein each of said multiplicity of chromatographic columns is aligned with one of said multiplicity of outlet ports so as to allow for fluid flow from said column through said outlet
(Continued)

port. The system optionally additionally facilitates the analysis of the components. The invention additionally provides a method for the separation of the components of a sample of material which comprises the use of the apparatus and system of the invention. The apparatus, system and method of the invention are advantageously applied to the separation and analysis of radioactive materials.

27 Claims, 10 Drawing Sheets

(51) Int. Cl.
- *G01N 30/60* (2006.01)
- *G21F 9/30* (2006.01)
- *G21F 9/34* (2006.01)
- *G21F 9/12* (2006.01)
- *B01D 15/22* (2006.01)
- *G01N 1/40* (2006.01)
- *G01N 30/74* (2006.01)

(52) U.S. Cl.
CPC ... *B01L 3/502738* (2013.01); *B01L 3/502753* (2013.01); *G01N 1/405* (2013.01); *G01N 30/462* (2013.01); *G01N 30/6095* (2013.01); *G21F 9/12* (2013.01); *G21F 9/30* (2013.01); *G21F 9/34* (2013.01); *B01L 2200/04* (2013.01); *B01L 2200/082* (2013.01); *B01L 2200/16* (2013.01); *B01L 2300/027* (2013.01); *B01L 2300/0829* (2013.01); *B01L 2300/0883* (2013.01); *B01L 2400/0481* (2013.01); *B01L 2400/0644* (2013.01); *B01L 2400/0655* (2013.01); *B01L 2400/0666* (2013.01); *G01N 30/74* (2013.01)

(56) References Cited

U.S. PATENT DOCUMENTS

| | | |
|---|---|---|
| 5,238,556 A | 8/1993 | Shirkhan |
| 5,340,543 A | 8/1994 | Annino et al. |
| 2004/0026617 A1 | 2/2004 | Gregori et al. |
| 2008/0053543 A1 | 3/2008 | Baier |
| 2009/0218286 A1 | 9/2009 | Bisschops et al. |
| 2012/0122076 A1 | 5/2012 | Lau et al. |
| 2012/0273350 A1 | 11/2012 | Piechotta et al. |
| 2013/0174642 A1 | 7/2013 | Bourlon et al. |
| 2013/0206653 A1* | 8/2013 | Brann .............. B01D 15/22 210/85 |
| 2013/0248451 A1 | 9/2013 | Hall et al. |
| 2013/0260419 A1 | 10/2013 | Ransohoff et al. |
| 2013/0280788 A1 | 10/2013 | Skudas |

FOREIGN PATENT DOCUMENTS

| | | |
|---|---|---|
| EP | 0552529 A1 | 7/1993 |
| EP | 1775001 A1 | 4/2007 |
| EP | 2656892 A1 | 10/2013 |
| JP | 2005509142 A | 4/2005 |
| WO | 02101383 A1 | 12/2002 |
| WO | 2007140739 A2 | 12/2007 |
| WO | 2008127087 A1 | 10/2008 |
| WO | 2012058516 A1 | 5/2012 |
| WO | 2012058559 A2 | 5/2012 |
| WO | 2013050104 A | 4/2013 |
| WO | 2013159858 A1 | 10/2013 |

\* cited by examiner

| Protocol Name | | | | | | |
|---|---|---|---|---|---|---|
| Sample Volume | | 50ml | | | | |
| Step 1 | Input | Path | Output | Fluid | Volume | Flow Rate |
| Step 2 | Anion | All | Waste | 9M HCl | 10ml | 0.1ml/min |
| Step 3 | Anion | Anion | Isotope 1 | 4M HCl | 2ml | 0.1ml/min |
| Step nth | Anion | All | Waste | 9M HCl | 10ml | 0.1ml/min |

MULTI-COLUMN SEPARATION APPARATUS AND METHOD

CROSS REFERENCE TO RELATED APPLICATIONS

This application is a 35 U.S.C. § 371 U.S. national phase entry of International Application No. PCT/GB2015/050130 having an international filing date of Jan. 21, 2015, which claims the benefit of Great Britain Application No. 1401010.2 filed Jan. 21, 2014, each of which is incorporated herein by reference in its entirety.

FIELD OF THE INVENTION

The present invention relates to the separation of mixtures of materials to facilitate easier analysis of the components of the mixtures. More particularly, the invention is concerned with the chromatographic separation of mixtures of materials, most particularly with the separation of mixtures which comprise radioactive components.

BACKGROUND TO THE INVENTION

The nuclear industry has a constant ongoing requirement for the separation and analysis of samples of material which are obtained from reactors, production facilities, reprocessing plants and waste stores. Typically, such materials are hazardous in nature due to their radioactive content, and more reliable and efficient methods of separating these materials on an analytical scale in order to accurately establish the identity and relative content of their constituent materials are constantly being sought The requirement for an understanding of the nature and make-up of such radioactive materials is illustrated by the estimated 43,000 radiochemical samples that are processed every year by UK laboratories which service reactor operators, fuel production facilities, reprocessing plants and waste stores, at a combined cost of around £40M. This figure increases 5-fold if similar testing across the US and Europe, which takes place at over 100 sites, is taken into account. Indeed, it is estimated that a standard full suite of analytical tests for a radioactive sample from the nuclear industry would typically cost in the region of £1000. It is clear, therefore, that there is a requirement for new and more efficient procedures to be developed in order to service this demand.

Most particularly, it is the case that present techniques typically require samples to be extracted and then transported to the designated testing facilities which are equipped to handle such samples. Clearly, this provides significant logistical problems in view of the hazardous nature of the materials. Consequently, the present invention seeks to provide an apparatus and method which effectively allows the laboratory to be brought to the sample, thereby offering simpler, cheaper and quicker in-situ analysis, which eliminates the need to extract and transport samples and, in some cases, is also able to facilitate sample analysis where it was previously not possible due to raised activity levels or a greater or lesser degree of inaccessibility.

Separation techniques which are employed for in the analysis of samples in the laboratory are commonly based on chromatographic separation using techniques such as column chromatography, gas/liquid chromatography, ion-exchange chromatography, reversed-phase chromatography, size-exclusion chromatography, and the like. Many such techniques are widely discussed in the literature and are well known to those skilled in the art of analytical chemistry.

Increasingly sophisticated and automated chromatographic methods are now available to analysts. Thus, for example, chromatography devices may include multiple columns, allowing for the separation of various components of a mixture, as in U.S. Pat. No. 5,340,543, which discloses a device for separating sample fluids from carrier fluids and analysing the samples which is configured as a modular unit comprising a chromatography cartridge which enables repairs to be quickly effected on the unit and also greatly simplifies the task of accessing the components of the cartridge. The cartridge is comprised of separation columns for separating the sample from the carrier, and additionally includes detectors for detecting distinguishing characteristics of fluids exiting the columns. The cartridge also preferably includes valve assemblies for directing the flow of the fluids through the cartridge and restrictors for adjusting the flow rate of the fluids. The components of the cartridge are configured on a manifold which has a means for attaching the cartridge to fluid sources.

WO-A-2012/058559 teaches a sample preparation and analysis system which includes a housing with a sample preparation station and a sample analysis station within the housing. The analysis station is spaced away from the preparation station and a transport assembly is configured to move at least one sample within the housing and between the preparation station and the analysis station.

US-A-2013/260419, like much of the prior art in this area, is concerned with biological applications and is directed to the development of continuous processing technology for the purification of biopharmaceuticals and biological products, such as monoclonal antibodies, protein therapeutics, and vaccines. Methods for continuous processing of a biological product in a feed stream toward formulation of a purified bulk product are described, together with a system which involves a plurality of chromatography columns connected in series through intervening valve modules.

WO-A-2012/058516 is concerned with a system for providing a solvent or reagent to a liquid chromatography system which comprises: a valve comprising a common port and a plurality of other ports, configurable such that the common port may be fluidically coupled to any one of the other ports; a pump fluidically coupled to the common port of the valve; a plug configured to block flow through a first one of the other ports of the valve; a container containing the solvent or reagent, the container being fluidically coupled to a second one of the other ports of the valve; a fluid tubing line having a known resistance to fluid flow fluidically coupled to a third one of the other ports of the valve; and a pressure gauge configured to measure fluid pressure within the pump, wherein the solvent or reagent is provided to the liquid chromatography system by a fourth one of the other ports.

US-A-2013/206653 relates to a cartridge for chromatographic separations which comprises a housing, at least a first and a second chromatography column at least partially passing through the housing, wherein each chromatography column comprises a first and a second end fitting operable to connect the chromatography to external tubing of a chromatography system. Connection fittings protruding outside of the housing at each end of each column enable fluidic connection to a chromatograph plumbing system and/or mass spectrometer detector. The cartridge may comprise heaters and temperature sensors and optional sensors to monitor fluid flow rate or pH and a passive identification feature, such as a barcode or RFID module, may identify the cartridge and its associated chromatography methods to external software. Further, an on-board memory module and controller chip may be used to actively record computer-readable module information, including module history information, the information being transferable through a standard interface, such as a USB port.

US-A-2009/218286 describes a device for chromatographic separations which comprises a manifold comprising a plurality of connectors for connecting to one or more chromatographic separation columns and/or feed or extraction tubing. At least one central duct is formed between at least two connectors forming an inlet and an outlet respectively, the central duct comprising a closable duct valve and a plurality of branch ducts branching from the central duct to a branch connector. The branch duct comprises a closable branch valve, wherein at least one branch duct is positioned between the inlet and the central duct valve and wherein at least one branch duct is positioned between the outlet and the central duct valve. The device is arranged for carrying out single-column and (continuous) multicolumn chromatographic separations, thereby allowing for the purification of biopharmaceutical products without having to develop, demonstrate and validate cleaning procedures for the valves.

The present inventors, however, are concerned with applications in the field of nuclear technology and seek to provide a system and method which facilitates the safe and efficient separation of radioactive materials generated from reactors, fuel production facilities, reprocessing plants and waste stores. Specifically, the present invention seeks to provide a chromatographic separation system which allows for simple, efficient and cheap in situ separation and testing of radioactive materials and thereby results in reduced sample transportation requirements and significantly reduced processing costs. Typical prior art systems for the separation and analysis of radioactive samples require transportation of samples to specified laboratories wherein separate prolonged separation procedures are performed in order to isolate specific materials from the samples. Analysis of these samples then takes place using a variety of techniques so as to establish the exact constituents, and relative contents thereof, which are contained in the sample. All this effort typically results in a procedure which takes several days to perform and is correspondingly expensive.

The invention, however, essentially uses the principles of microfluidic technology to provide a single unit which combines extraction and separation technologies to allow for the isolation of alpha-, beta- and gamma-ray emitting species, and the subsequent spectroscopic analysis of these species so as to provide a significantly faster and cheaper route to the required information. The system can be deployed in a conventional laboratory at the point of sample, thereby removing the expense and safety/environmental/containment issues associated with the transport of samples. The system may also be utilised to provide critical information throughout the nuclear fuel cycle in applications such as fuel fabrication, reactor operations, reprocessing and waste storage, since it offers an on-line monitoring system capable of providing in-situ alpha, beta and gamma spectroscopic analysis of samples which has universal applicability across the nuclear fuel cycle. Thus, for example, the system may be used in association with on-line quality control at fuel production facilities, on-line analysis of cooling cycle material on a reactor site, on-line analysis of material within a reprocessing facility with possible control feedback, in-situ characterisation of waste material to determine sentencing strategies, as well as characterisation requirements associated with interim and even long term waste storage.

SUMMARY OF THE INVENTION

In accordance with a first aspect of the present invention there is provided an apparatus for the separation of the components of a sample of material, said apparatus comprising a cartridge comprising: at least one sample inlet port, at least one resin inlet port and a multiplicity of reagent and purge fluid input ports which are fluidically connected via a multiplicity of control valves to a multiplicity of chromatographic columns which are fluidically connected together in series; and a multiplicity of outlet ports wherein each outlet port additionally comprises an outlet valve which is adapted to control the flow of fluid aligned with one of said multiplicity of outlet ports so as to allow for fluid flow from said column through said outlet port.

Said outlet valves are typically located at the upstream end of said outlet ports.

In embodiments of the invention, said apparatus comprising a cartridge comprises a multiplicity of different layers, and typically comprises at least a first layer and a second layer.

Certain embodiments of the invention envisage an apparatus comprising a cartridge which comprises:
(a) a first layer comprising:
  (i) a sample inlet port, at least one resin inlet port and a multiplicity of reagent and purge fluid input ports which are fluidically connected via a multiplicity of control valves to
  (ii) a multiplicity of chromatographic columns which are fluidically connected together in series; and
(b) a second layer comprising a multiplicity of outlet ports wherein each outlet port additionally comprises an outlet valve which is adapted to control the flow of fluid through said outlet ports,
wherein each of said multiplicity of chromatographic columns is aligned with one of said multiplicity of outlet ports so as to allow for fluid flow from said column through said outlet port.

In certain embodiments of the invention, said first layer comprises an upper layer and said second layer comprises a lower layer.

Said cartridge is typically formed from a plastic material which is chemically resistant to the various samples and reagents which are used in connection with the system. A particularly suitable material in this regard is found to be polycarbonate resin.

Typical cartridge dimensions are determined by the particular application in which the cartridge is to be deployed and the cartridge may be of any size which is suitable for the particular application. Typical dimensions, however, are generally in the region of from 50-500 mm length, from 25-350 mm width and from 2-40 mm depth. In embodiments of the invention, said dimensions are in the region of from 75-300 mm length, from 50-250 mm width and from 5-30 mm depth. In further embodiments of the invention, said dimensions are in the region of from 100-200 mm length, from 75-200 mm width and from 10-20 mm depth. In certain specific applications suitable dimensions have been found to be approximately 140 mm length×100 mm width×15 mm depth.

The chromatographic columns may be linear and/or non-linear, depending on the desired path length through the column. Longer path lengths may be achieved by incorporating a series of U-bends into the columns. The columns are capillary channels which typically have volumes of from 0.1 to 50 ml, more typically from 2 to 25 ml and most typically from 5 to 15 ml. The degree of non-linearity and the number of bends in the column can be used to control its volume.

Said chromatographic columns contain chromatographically active resins, chosen to provide a separation of the material sample into its constituent components. The resins are introduced into the columns using standard slurry packing procedures which would be well known to those skilled in the art, and enter the cartridge by means of at least one resin inlet port provided in said first upper layer of said cartridge. The packing density is controlled in production by monitoring/controlling the flow rate, turbidity and packing back pressure.

Said cartridge is adapted so as to allow for the introduction and removal of the chromatography resin in a convenient manner. Thus, the resin inlet ports are removably attached such that they can be disassembled from the cartridge, either manually or by means of a mechanised method, following use of the cartridge. In this manner it is possible, via use of the fluid entry and exit ports, to use a liquid in order to facilitate the flushing out of contaminated resin, such that it can be stored and/or disposed of remotely from the cartridge.

Each chromatographic column includes means to prevent the escape of said resin materials from said columns. Said means may, for example, comprise plugs of inert materials. Most conveniently, however, said means may be formed from frits of a suitable inert material, particular examples of which are porous polycarbonate frits and porous PTFE frits.

The various inlet ports are presented on the upper surface of the cartridge. Typically, a single sample inlet port is provided. In embodiments of the invention, said inlet port comprises means for delivery of a fluid sample into the cartridge. Suitable fluidic delivery systems may, for example, comprise a fluidic coupling comprising a pressure fitting, adapted to facilitate presentation of the sample to the cartridge via, for example, pipetting means comprising a metered sampler, the tip of which may be held under force to the cartridge inlet so that the fluid sample is pumped into the cartridge. In certain embodiments of the invention the pipetting means/sampler comprises a disposable pipette head, which is replaced for each different sample in order to avoid any possibility of contamination. In alternative embodiments of the invention, the pipetting means/sampler may comprise a disposable syringe.

The cartridge has a multiplicity of reagent and purge inlet ports which, in typical embodiments of the invention, comprises fluidic couplings comprising pressure fittings. The number of ports is typically determined by the particular application for which the cartridge is intended, but may typically range from 2 to 40, more typically from 2 to 20, most typically from 2 to 12.

Optionally, the upper surface of the cartridge may be overlaid by a manifold incorporating ports through which the inlet ports in the cartridge may be accessed.

The chromatographic columns are connected together in series by a multiplicity of said control valves and the flow of fluid through the columns is controlled by said control valves. Thus, the control valves are adapted to couple the inlet ports, via fluidic channels, to the chromatographic columns, and to interconnect the chromatographic columns so as to allow the sample to flow through the columns, and then to decouple the columns in order that each column may be individually processed using the various reagents. In certain embodiments of the invention, the control valves may comprise in-built membrane valves, which may comprise malleable or deformable membranes; examples of such valves are Viton valves.

The outlet ports may conveniently be presented on the lower surface of the cartridge which comprises a multiplicity of these ports. The number of ports is typically determined by the particular application for which the cartridge is intended, but may typically range from 2 to 20. As previously noted, the outlet ports comprise outlet valves which are adapted to control the flow of fluid through said outlet ports. In certain embodiments of the invention, said outlet valves may comprise membrane valves, which may, for example, comprise a membrane chamber containing a membrane. The outlet valves are typically located at the upstream end of said outlet ports.

Typically, the exiting fluids are collected in suitable collection reservoirs, which may be fixed or moveable reservoirs. In further embodiments of the invention said outlet ports may control the flow of fluid to other chromatographic columns or to downstream instrumentation.

In embodiments of the invention wherein the outlet valves in the outlet ports comprise membrane valves, actuators may be provided which co-operate with the membranes in the outlet ports so as to allow the flow of fluid through the outlet ports. Said actuators are typically operated by mechanical, electromechanical or electromagnetic means, or by the use of compressed air. In certain embodiments of the invention, said actuators, e.g. mechanical actuators, may be comprised in collection reservoirs. In certain embodiments of the invention, actuators may comprise movable members, such as rods, which engage with the membranes.

In embodiments of the invention, the collection reservoirs may be comprised in separate collection vessels. In alternative embodiments of the invention, the collection reservoirs are comprised in collection vessels which include a multiplicity of separate compartments. The collection vessels are typically disposed in a linear or rotary arrangement.

In various embodiments of the invention, the cartridge of the invention may comprise anything from 2 to 40 chromatographic columns, typically from 2 to 20 columns, more typically from 2 to 12 columns. In the most typical embodiments of the invention, cartridges contain 2, 3 or 4 columns.

It is envisaged that the apparatus of the first aspect of the invention is a disposable, single-use system, such that the working life of an individual cartridge may be measured in terms of minutes. In this way, cross contamination may be avoided, and no cleaning of the cartridges is necessary, further improving the efficiency of the system.

Cartridges comprising the apparatus of the first aspect of the invention provide structural integrity for the purposes of their function and handling. However, the cartridges are typically adapted for disposal such that they may, after use, be compressed into a volume smaller than their functional volume. Typically, compression of the cartridges is carried out following removal of resin from the columns.

In typical embodiments of the invention, the cartridge is adapted for use in association with suitable analytical systems and various control and experimentation software. Examples of analytical systems include analytical instruments designed to conduct spectroscopic and spectrometric analyses including, for example, spectrophotometers for conducting infra-red or ultra-violet/visible spectrophotometric analysis of samples obtained from the system. Alternative analytical systems may, for example, comprise inductively coupled plasma mass spectrometry (ICP-MS), or alpha-, beta- or gamma-counters.

Control and experimentation software may be provided in order to automate the processes of sample introduction into the cartridge, the addition of reagents and purging materials to the apparatus and the subsequent collection of samples therefrom. Suitable software may be used to control the operation of valves throughout the system. Conveniently, reagent containers may be connected to a cartridge as hereinbefore defined in order that the addition of reagents to the cartridge may be automated by means of the software. Similarly, collection reservoirs may also be connected to the cartridge, thereby allowing the collection of fluids exiting the cartridge to be automatically controlled by the system software. The provision of appropriate software for these purposes would be a routine operation for a person skilled in the art.

Thus, according to a second aspect of the present invention, there is provided a system for the separation of the components of a sample of material, said system comprising:
  (a) a cartridge according to the first aspect of the invention;
  (b) a plurality of reagent containers;
  (c) a plurality of collection reservoirs;
  (d) means for the mixing of reagents and controlled transfer of reagents from reagent containers to the cartridge; and
  (e) means for controlling the collection of samples from the cartridge.

Optionally, said system additionally facilitates the analysis of said components and comprises at least one analytical facility. Said at least one analytical facility may comprise at least one analytical instrument, for example a spectrophotometer, spectrometer or inductively coupled plasma mass spectrometer, or an alpha-, beta- or gamma-counter.

Said means for the mixing of reagents and controlled transfer of reagents from reagent containers to the cartridge and means for controlling the collection of samples from the cartridge may suitably comprise valves—which may optionally comprise membranes—controlled by means of software.

In specific embodiments, systems of the invention comprise means for the pumping of reagents and purging fluids through the system. Typically, said systems may include syringe pumps.

Embodiments of the invention also envisage systems wherein mixing of reagents is facilitated prior to their entry into the chromatographic columns by the incorporation of means for effecting such mixing of fluids. Typically such embodiments include rotary valves and mixing chambers.

Typically control of the means for pumping and mixing of the various fluids is effected automatically by means of suitable software.

More specifically, means for the mixing of reagents and their controlled transfer from reagent containers to the cartridge typically comprises a plurality of pumps and valves, for example syringe pumps, flow selection valves and rotary valves. Said means facilitates the mixing of various individual reagents to provide a multiplicity of mixed reagents and their transfer to the cartridge. Thus, for example, in one embodiment of the invention five concentrated reagents may be mixed to provide seventeen different mixed reagents which may then be employed as washes and eluents for the columns in the cartridge. Mixing is typically carried out in mixing chambers which are fluidically connected to the columns.

In typical embodiments of the invention, each column in a cartridge is fluidically connected in series to one mixing chamber, one rotary selection valve, one syringe pump and one flow selection valve, with the reagent containers being connected to the flow selection valves. Thus, in an embodiment, a column is connected to a mixing chamber which then connects to a multi-way flow selection valve via a multi-way rotary selection valve which is also connected to a syringe pump. Thus, in operation, the syringe pump draws in the desired reagents from the reagent containers via the flow selection valve and the rotary selection valve. The full syringe then discharges its contents via the rotary selection valve to the mixing chamber and, thence, to the column. The rotary selection valve optionally additionally comprises air inlet and waste outlet channels which may be utilised for flushing the valve with air and/or deionised water from a reagent container, which may then be discharged to waste.

The present invention particularly envisages the application of the apparatus and system of the invention to the separation of, or the separation and analysis of, samples of radioactive materials. More specifically, the apparatus and system find application in the provision of in-situ alpha, beta and gamma spectroscopic analysis of samples generated across the nuclear fuel cycle.

In said applications, the cartridge of the invention most typically includes 2, 3 or 4 chromatographic columns. In certain embodiments of the invention, the cartridge includes 4 chromatographic columns.

In particular embodiments of the invention, different chromatographic columns contain different chromatographically active resins. In particular embodiments of the invention said resins are specifically applied to the separation of radioactive materials such as radioactive isotopes. Thus, when applied to the separation of samples of radioactive materials, suitable chromatographically active resins may, for example, include adsorbent resins or chemically active resins such as ion exchange resins, specific examples of which may include anion exchange resins, UTEVA® resin (dipentyl pentylphosphonate loaded on an inert support), TRU resin (octylphenyl-N,N-di-isobutyl carbamoylphosphine oxide/tri-n-butyl phosphate loaded on an inert support) and Sr resin (4,4'-(5')-di-t-butylcyclohexano 18-crown-6 (crown ether)/1-octanol loaded on an inert support).

In applications related to the separation and optional further analysis of radioactive samples, the plurality of reagent containers typically comprises from 4 to 8 input reagent containers, whilst the plurality of collection reservoirs suitably includes from 8 to 15 output collection reservoirs. In specific embodiments of the invention, cartridges typically comprise a single sample inlet port, four columns, four reagent inlet ports and four outlet ports. In further specific embodiments of the invention, systems may be provided which include 5 reagent containers. In further specific embodiments of the invention, systems may be provided which include 11 collection reservoirs.

According to a third aspect of the invention, there is provided a method for the separation of the components of a sample of material, said method comprising the steps of:
  (a) inserting said sample in an apparatus according to the first aspect of the invention via an inlet port;
  (b) processing the sample through said apparatus; and
  (c) collecting fluids from outlet ports of said apparatus.

If necessary, said sample may be digested in at least one suitable solvent prior to insertion in said apparatus.

The invention also envisages embodiments wherein said method additionally provides for the analysis of said fluids collected from said outlet ports. Thus, there is also provided a method for the separation and analysis of the components of a sample of material, said method comprising performing the steps of the method of the third aspect of the invention, together with the additional step of:

(d) analysing the fluids collected from said outlet ports of said apparatus.

In embodiments of the invention, said method for the separation and analysis of the components of a sample of material comprises the step of spectrophotometric or spectrometric, inductively coupled plasma mass spectrometric (ICP-MS), or alpha-, beta- or gamma-counting analysis of the fluids collected from said outlet ports of said apparatus. Said embodiments of the invention may conveniently be carried out using the system according to the second aspect of the invention.

In embodiments of the invention, said method according to the third aspect of the invention comprises the separation of, or the separation and analysis of, samples of radioactive materials. More particularly, the method comprises the separation and alpha-, beta- and gamma-spectroscopic analysis of samples generated across the nuclear fuel cycle.

Said embodiments of the invention typically involve the use of cartridges which include 2, 3 or 4 chromatographic columns. In certain embodiments of the invention, cartridges include 4 chromatographic columns.

In embodiments of the invention involving the separation of, or the separation and analysis of, samples of radioactive materials, the chromatographic columns may, for example, contain chromatographically active resins which are optionally selected from such as ion exchange resins, specific examples of which may include anion exchange resins, UTEVA® resin (dipentyl pentylphosphonate loaded on an inert support), TRU resin (octylphenyl-N,N-di-isobutyl carbamoylphosphine oxide/tri-n-butyl phosphate loaded on an inert support) and Sr resin (4,4'-(5')-di-t-butylcyclohexano 18-crown-6 (crown ether)/1-octanol loaded on an inert support).

In embodiments related to the separation and optional further analysis of radioactive samples, apparatus may be employed which typically comprises from 4 to 8 input reagent containers and from 8 to 15 output collection reservoirs. In specific embodiments of the invention, systems may be used which include 5 reagent containers and/or 11 collection reservoirs.

In embodiments of the invention wherein separation and optional further analysis of radioactive samples is carried out, suitable reagents for effecting the chromatographic separation of the sample components include inorganic acids such as nitric acid and hydrochloric acid, organic acids such as oxalic acid, and inorganic salts including ammonium salts, most particularly ammonium halides such as ammonium iodide. Deionised water is typically also used as a reagent which can be utilised to adjust the concentrations of other reagents; deionised water also finds application as a purging reagent.

In typical embodiments of the invention involving the separation and optional further analysis of radioactive samples, separation of the samples provides different output streams which separately comprise components comprising thorium, plutonium, neptunium, technetium, uranium, americium/curium and strontium.

The individual chromatographic columns included in the apparatus according to the invention will each produce their own waste streams. Thus, in specific embodiments of the invention wherein apparatus comprising 2, 3 or 4 separate chromatography columns is employed, 2, 3 or 4 additional waste streams will be produced. Hence, in embodiments of the invention wherein 4 separate chromatography columns are present and the separation and optional further analysis of radioactive samples is carried out, 4 waste streams will be produced, together with the above mentioned 7 output streams of separated components, thereby requiring the provision of 11 collection reservoirs.

In embodiments, the method of the invention additionally comprises the step of removing contaminated resin from the columns following use of the apparatus of the invention for the separation of the components of a sample of material, and/or the step of compressing said apparatus for disposal. The step of compression is typically carried out following said removal of resin.

The apparatus and method of the invention provides a system wherein the laboratory is effectively brought to the sample, thereby offering simpler, cheaper and quicker in-situ analysis and eliminating the need to extract and transport samples, thereby providing significant additional cost, safety and environmental benefits. The apparatus and method find particular applicability in the separation and optional further analysis of radioactive samples, particularly those generated across the nuclear fuel cycle.

BRIEF DESCRIPTION OF THE DRAWINGS

Embodiments of the invention are further described hereinafter with reference to the accompanying drawings, in which.

DETAILED DESCRIPTION OF THE INVENTION

Figure 1:
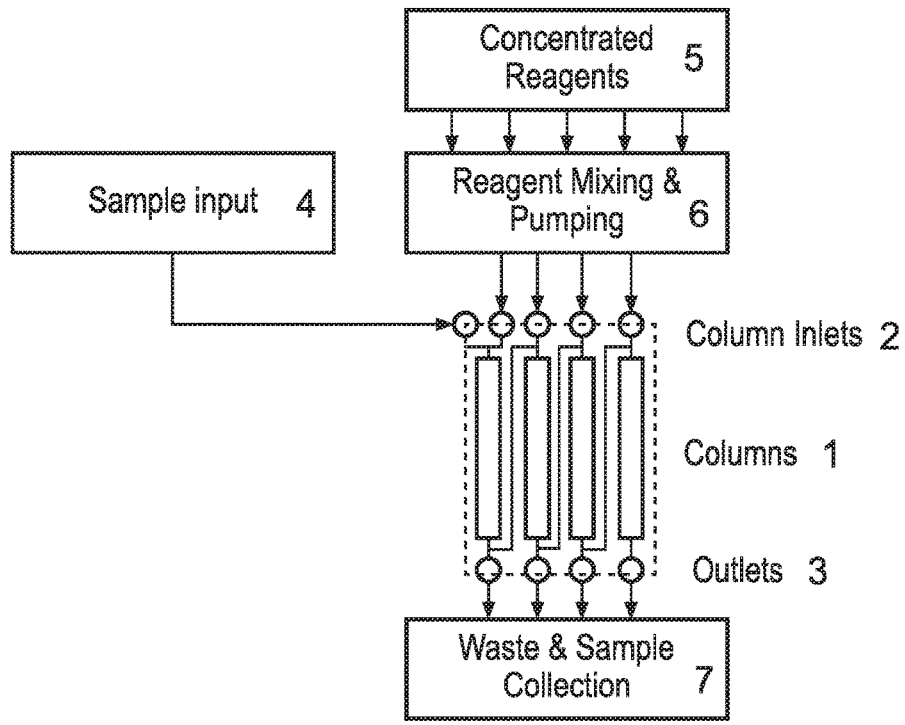
FIG. 1 is a schematic overview of a separation system incorporating the apparatus of the invention for performing the method of the invention.

The present invention provides an apparatus for the separation of the components of a sample of material, said apparatus comprising a cartridge comprising: at least one sample inlet port, at least one resin inlet port and a multiplicity of reagent and purge fluid input ports which are fluidically connected via a multiplicity of control valves to a multiplicity of chromatographic columns which are fluidically connected together in series; and a multiplicity of outlet ports wherein each outlet port additionally comprises an outlet valve which is adapted to control the flow of fluid through said outlet ports; wherein each of said multiplicity of chromatographic columns is aligned with one of said multiplicity of outlet ports so as to allow for fluid flow from said column through said outlet port.

In embodiments of the invention, said apparatus comprising a cartridge comprises a multiplicity of different layers, and typically comprises at least a first layer and a second layer.

Certain embodiments of the invention envisage an apparatus comprising a cartridge which comprises:
(a) a first layer comprising:
  (i) a sample inlet port, a resin inlet port and a multiplicity of reagent and purge fluid input ports which are fluidically connected via a multiplicity of control valves to
  (ii) a multiplicity of chromatographic columns which are fluidically connected together in series; and
(b) a second layer comprising a multiplicity of outlet ports wherein each outlet port additionally comprises an outlet valve which is adapted to control the flow of fluid through said outlet ports,
wherein each of said multiplicity of chromatographic columns is aligned with one of said multiplicity of outlet ports so as to allow for fluid flow from said column through said outlet port.

In certain embodiments of the invention, said first layer comprises an upper layer and said second layer comprises a lower layer.

The invention also provides a system for the separation of the components of a sample of material, said system comprising:
(a) a cartridge as hereinbefore defined;
(b) a plurality of reagent containers;
(c) a plurality of collection reservoirs;
(d) means for the mixing of reagents and controlled transfer of reagents from reagent containers to the cartridge; and
(e) means for controlling the collection of samples from the cartridge.

Optionally, said apparatus additionally facilitates the analysis of said components and the cartridge is adapted for use in association with analytical systems and various control and experimentation software. Suitable analytical systems include analytical instruments designed to conduct spectroscopic and spectrometric analyses including, for example, spectrophotometers for conducting infra-red or ultra-violet/visible spectrophotometric analysis of samples obtained from the system, inductively coupled plasma mass spectrometers, or alpha-, beta- or gamma-counters. In certain embodiments of the invention, said analytical system comprises at least one spectrophotometer or spectrometer.

Furthermore, the invention provides a method for the separation of the components of a sample of material, said method comprising the steps of:
(a) inserting said sample in an apparatus according to the first aspect of the invention via an inlet port;
(b) processing the sample through said apparatus; and
(c) collecting fluids from outlet ports of said apparatus.

In embodiments of the invention, said method additionally envisages the analysis of said fluids collected from said outlet ports and, hence, there is also provided a method for the separation and analysis of the components of a sample of material, said method comprising performing the steps of the method as hereinbefore defined, together with the additional step of:
(d) analysing the fluids collected from said outlet ports of said apparatus.

The invention particularly envisages the application of the apparatus and system of the invention to the separation of, or the separation and analysis of, samples of radioactive materials. More specifically, the apparatus and system find application in the provision of in-situ alpha, beta and gamma spectroscopic analysis of samples generated across the nuclear fuel cycle.

In embodiments of the invention, the method for the separation and analysis of the components of a sample of material comprises the step of spectrophotometric, spectrometric, inductively coupled plasma mass spectrometric, or alpha-, beta- or gamma-counting analysis of the fluids collected from said outlet ports of said apparatus. Said embodiments of the invention may conveniently be carried out using the system according to the second aspect of the invention.

Considering now FIG. 1, there is seen a schematic overview of a separation system incorporating the apparatus of the invention wherein columns 1 have inlets 2 and outlets 3. A sample 4 is input into the first of the columns and concentrated reagents 5 are provided and undergo mixing and pumping 6 through the inlets 2. Following chromatographic separation, waste and sample collection 7 is achieved via the outlets 3.

Figure 2:
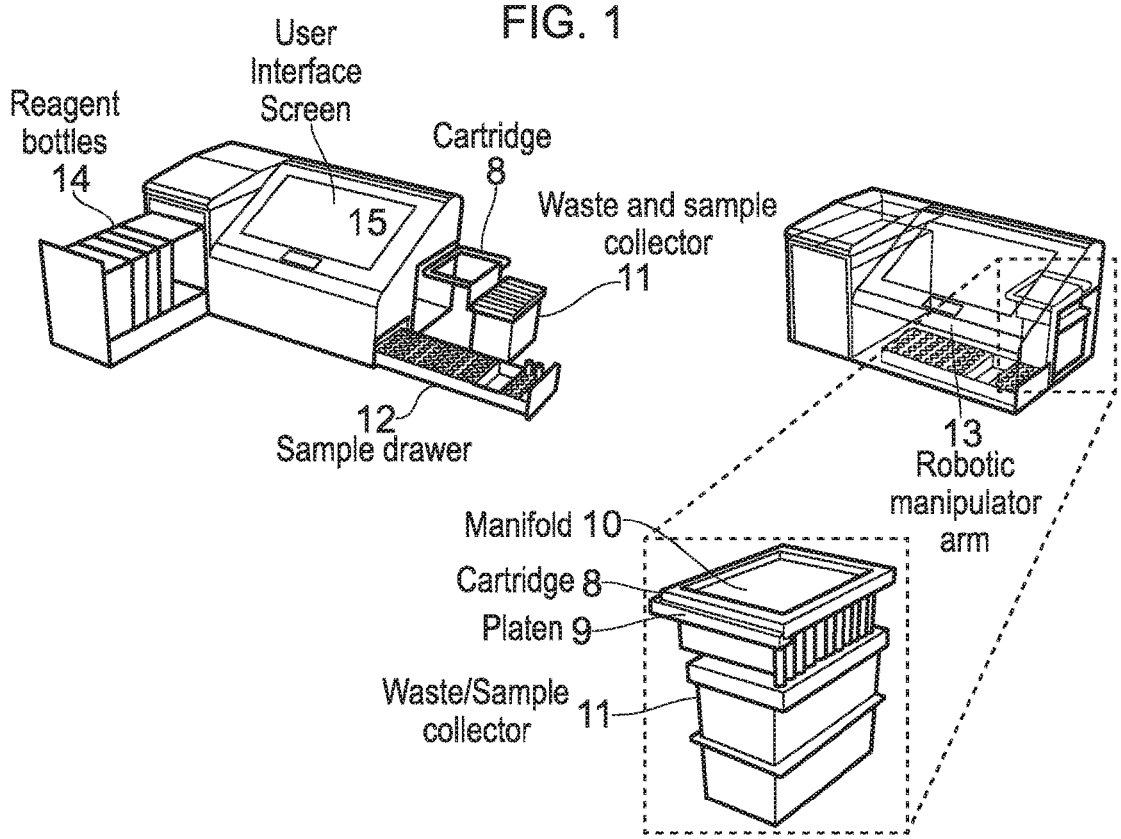
FIG. 2 is schematic overview of a separation and analytical system incorporating the apparatus of the invention for performing the method of the invention.

Turning now to FIG. 2, there is provided a schematic overview of a separation and analytical system incorporating the apparatus of the invention wherein a cartridge 8 may be inserted on a platen 9 of an apparatus and overlaid by a manifold 10. The assembly is placed above a waste and sample collector 11 and samples stored in a sample drawer 12 may be are introduced into the cartridge by means of a robotic manipulator arm 13. Reagents stored in reagent bottles 14 are then introduced into the cartridge in order to achieve the chromatographic separation. Operation of the apparatus may be achieved by means of the user interface screen 15, which also allows for the operational status of the apparatus to be gleaned.

Figure 3:
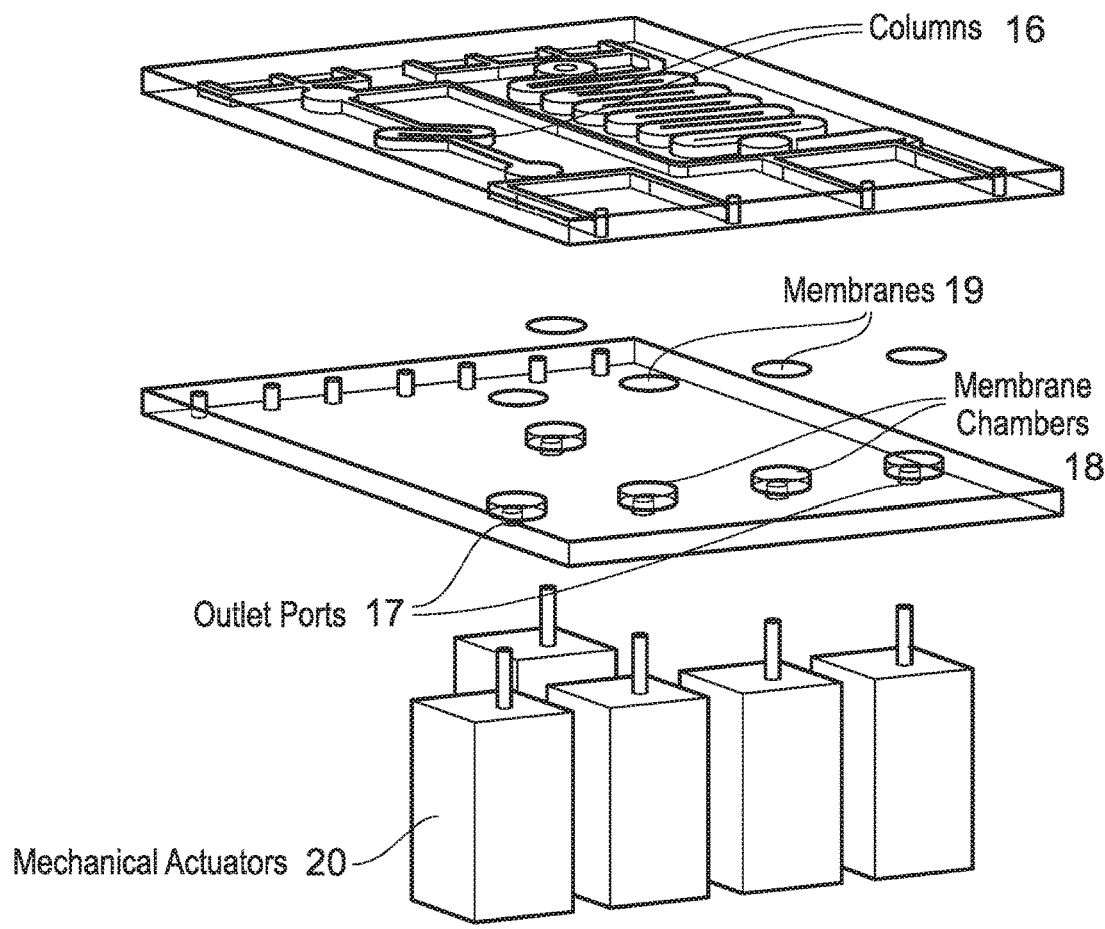
FIG. 3 shows an expanded view of a cartridge according to the invention comprising outlet ports having membrane valves together with actuators.

In FIG. 3 there is seen an expanded view of a cartridge according to the invention wherein columns 16 are shown on the top layer, whilst the bottom layer comprises outlet ports 17 which include outlet valves comprising membrane chambers 18 in the top of which are placed membranes 19. The lower end of the outlet ports provide access holes for the mechanical actuators 20 which include vertically protruding rods which interact with the membranes 19 to allow fluid to flow through the outlet ports 17.

Figure 4:
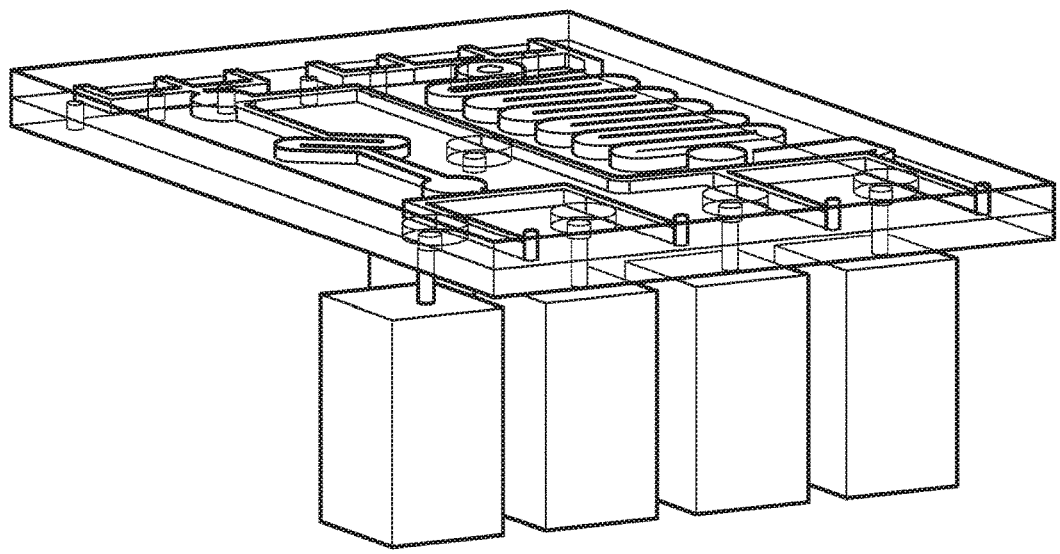
FIG. 4 shows a collapsed view of the cartridge according to the invention comprising outlet ports having membrane valves together with actuators.

FIG. 4 provides a collapsed view of the arrangement of FIG. 3 after the actuators have been engaged by the cartridge.

Figure 5:
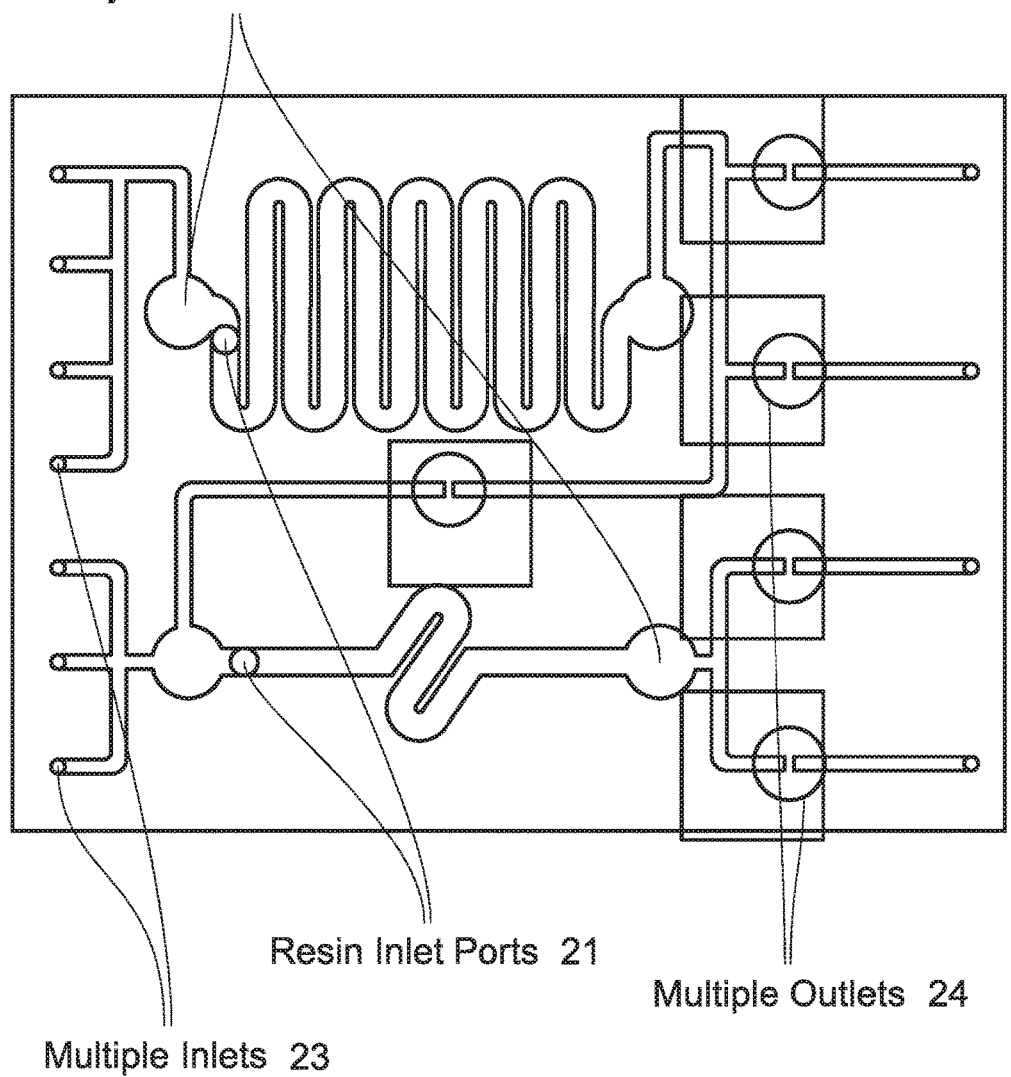
FIG. 5 provides a simplified plan view of a cartridge according to the invention which incorporates two chromatographic columns.

FIG. 5 shows a plan view of a cartridge according to the invention which incorporates two chromatographic columns connected in series and illustrating the resin inlet ports 21 and plugs of polycarbonate frits 22 used to retain the chromatographic resins in the columns. Each column also has multiple inlets 23 and multiple outlets 24.

Figure 6:
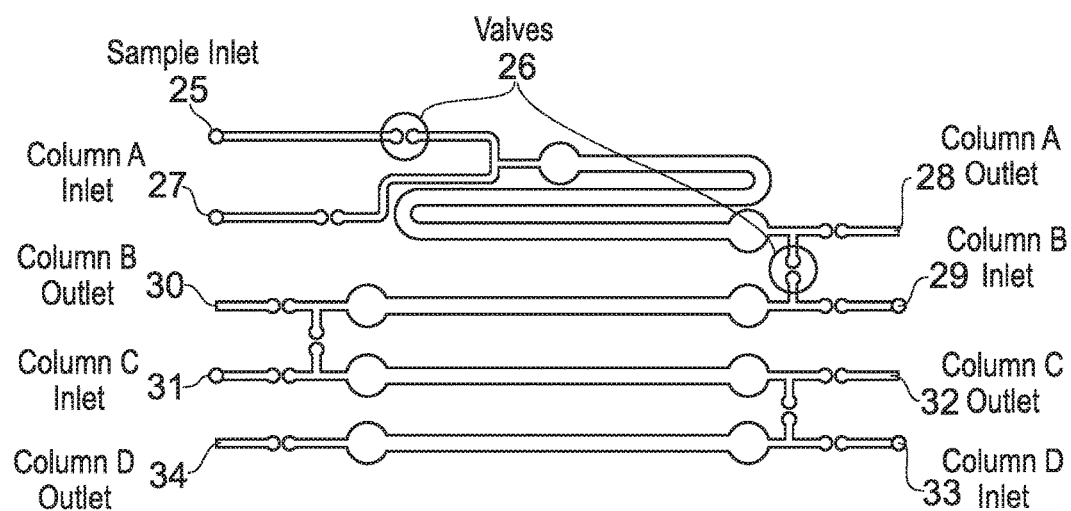
FIG. 6 provides a simplified plan view of a cartridge according to the invention which incorporates four chromatographic columns.

FIG. 6 shows a plan view of a cartridge according to the invention which incorporates four chromatographic columns wherein each column only has a single inlet and outlet. Thus, the cartridge has sample inlet 25 from which entry of the sample into the columns is controlled by a series of valves 26. Reagent enters column A through inlet 27 and provides an output fraction at outlet 28. Similarly, another reagent enters column B through inlet 29 and provides an output fraction at outlet 30, whilst a further reagent enters column C through inlet 31 and provides an output fraction at outlet 32 and a still further reagent enters column D through inlet 33 and provides an output fraction at outlet 34.

Figure 7A:
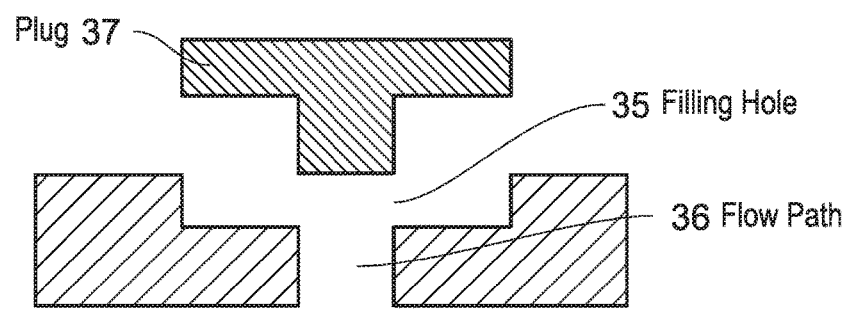
FIG. 7(a) depicts a cross-sectional view of an open resin inlet port in the upper layer of a cartridge according to the invention prior to filling the chromatographic columns with resin.
Figure 7B:
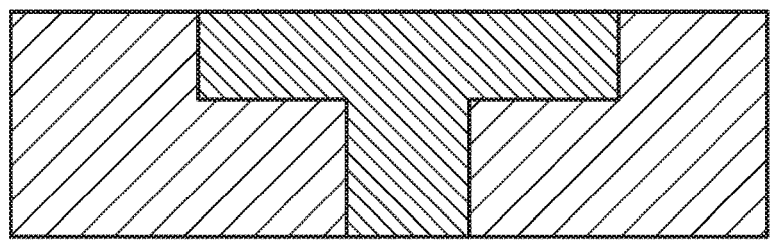
FIG. 7(b) depicts a cross-sectional view of a closed resin inlet port in the upper layer of a cartridge according to the invention after filling the chromatographic columns with resin.

In FIGS. 7(*a*) and 7(*b*) can be seen cross-sectional views of open and closed resin inlet ports in the upper layer of a cartridge according to the invention prior to and after filling the chromatographic columns with resin. Thus, the resin may be placed in filling hole 35 and enters the column through flow path 36 before the hole is sealed with plug 37.

FIGS. 8(*a*) and 8(*b*) provide cross-section illustrations of the sample inlet port in the upper layer of a cartridge according to the invention and a pipetting device both prior to engagement in the port and after it has become engaged in the port. Thus, a sample to be processed is contained in pipetting device 38 which includes 'O' ring 39 to provide fluidic allowing the sample to be released and to enter the apparatus through sample inlet channel 41. In the illustrated embodiment, the 'O' ring is located on the pipetting device; in alternative embodiments, the 'O' ring may be located on a surface to the cartridge.

Figure 9:
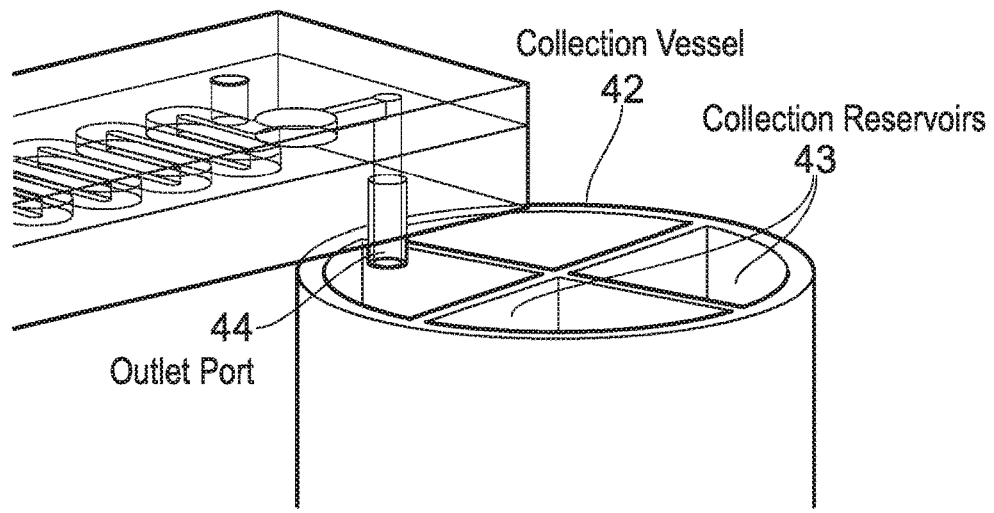
FIG. 9 shows a view of a typical rotary collection vessel with comprises separate collection reservoirs located below an outlet port of a cartridge according to the invention.

FIG. 9 offers an illustration of a rotary collection vessel 42 comprising separate collection reservoirs 43 which are located below an outlet port 44 of a cartridge according to the invention. By manipulation of the collection vessel, different collection reservoirs may be presented below different outlet ports (not shown).

Figure 10:
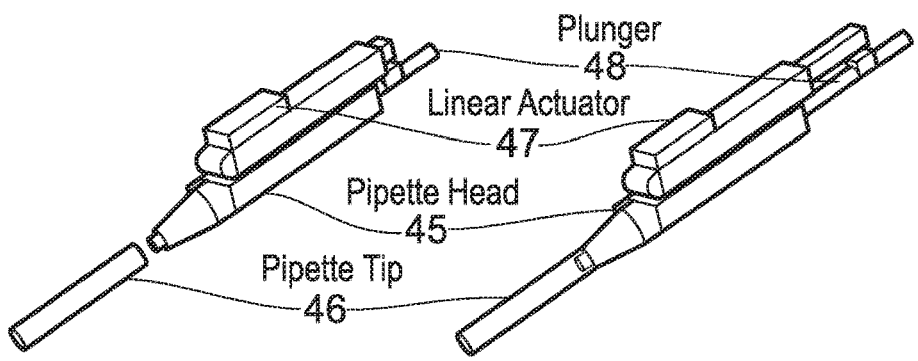
FIG. 10 depicts an autosampler which may be used as pipetting means for the transfer of samples from containers to a cartridge of the invention.

FIG. 10 shows a pipetting means in the form of an autosampler which is used to transfer samples from containers to a cartridge of the invention. Thus, there is depicted a pipette head 45 to which is connected a disposable pipette tip 46 and the autosampler also comprises a linear actuator 47 and plunger 48 which, in operation, may be depressed to cause the sample to flow into the apparatus of the invention.

Figure 11:
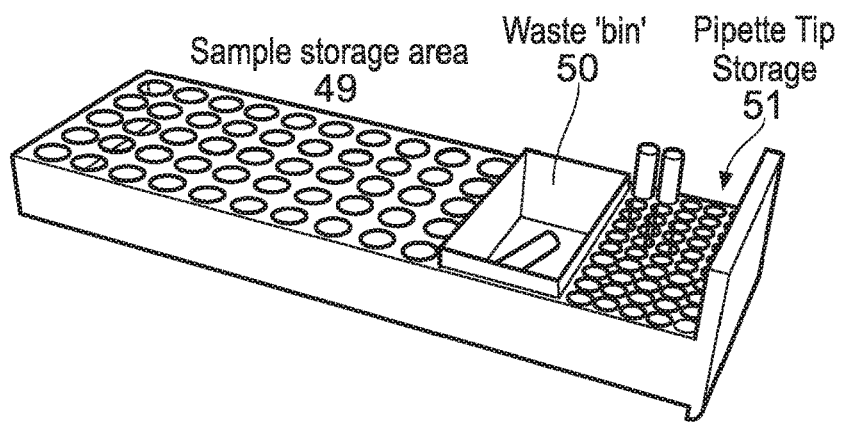
FIG. 11 illustrates a suitable storage arrangement for samples awaiting test, autosampler pipette tips ready for use and used (waste) pipette tips.

In FIG. 11 is illustrated a storage arrangement which is suitable for the autosamplers wherein a pipette tip may collect a sample from the sample storage area 49 which is then introduced into a cartridge (not shown), before the pipette tip is dispensed into waste bin 50 and a new pipette tip is collected from pipette tip storage area 51.

Figure 12:
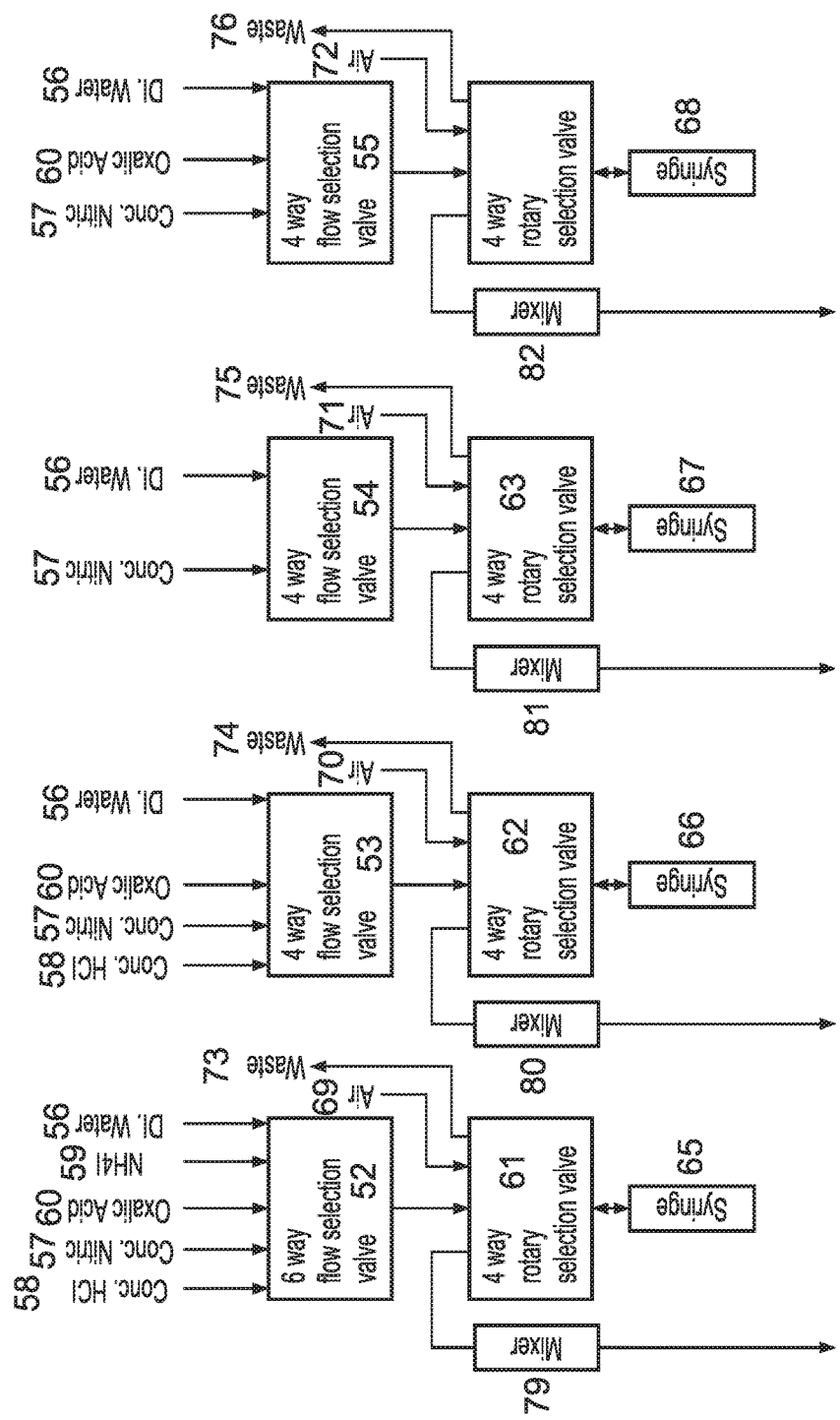
FIG. 12 provides a schematic illustration of a valve arrangement which may be used to effect the mixing and pumping of reagents into the chromatographic columns of a cartridge according to the invention.

FIG. 12 provides a representation of a valve arrangement used to effect the mixing and pumping of reagents into the chromatographic columns of a cartridge according to the invention. Thus, there are depicted a series of four flow selection valves including 6-way selection valve 52 and 4-way selection valves 53-55 into which may selectively be introduced reagents selected from deionised water 56, concentrated nitric acid 57, concentrated hydrochloric acid 58, ammonium iodide 59 and oxalic acid 60. Said flow selection valves 52-55 are fluidically connected to four corresponding rotary selection valves 61-64 which interact with four corresponding syringe pumps 65-68. Said rotary selection valves each additionally comprise air inlet ports 69-72 and waste outlet ports 73-76 and each rotary selection valve is fluidically connected to a mixing chamber 79-82 which, in turn, is fluidically connected to a chromatographic column located in a cartridge (not shown).

In operation, the syringe pump pulls in the components of the desired reagent from the six way flow selection valve 52. Thus, for example, a reagent comprising 4.5 M hydrochloric acid can be produced by drawing in from the concentrated hydrochloric acid 58 and the deionised water 56 reservoirs. The full syringe 65 can then be discharged to the corresponding mixing chamber 79, and thence to a column on the cartridge, by means of the rotary selection valve 61. The rotary selection valve 61 can then be employed so as charged into the rotary selection valve 61, via the flow selection valve 52 and used to clean the syringe, prior to being discharged through the waste port 73.

Figure 13A:
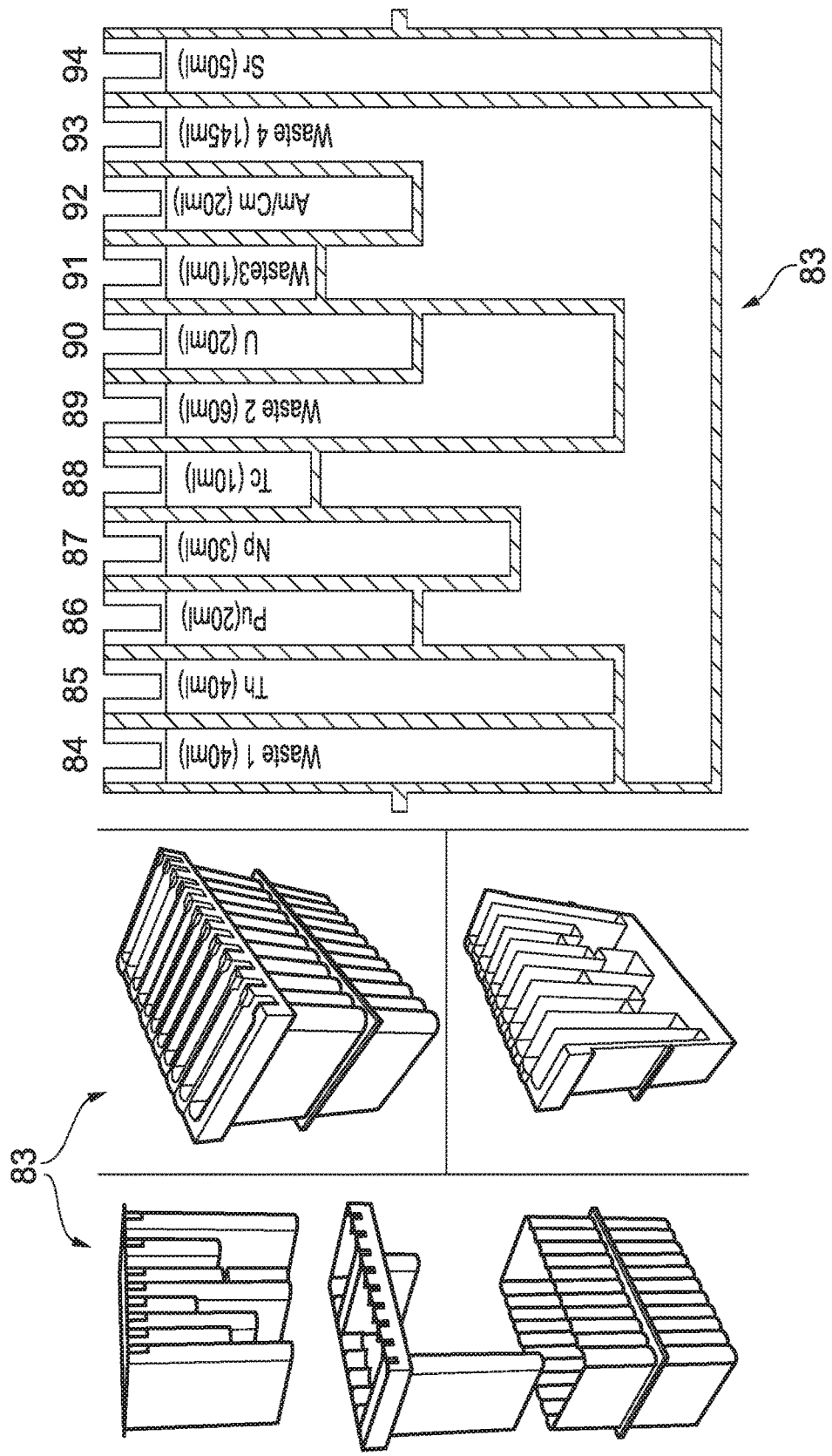
FIG. 13(a) provides a depiction of a collection vessel comprising a multiplicity of collection reservoirs which may be used in conjunction with the apparatus according to the invention.

FIGS. 13(*a*) and 13(*b*) relate to a specific collection vessel provided for use in a particular embodiment of the invention wherein the apparatus includes 4 chromatographic columns and is used for the separation of components comprised in radioactive samples. There is depicted a collection vessel 83 having 11 separate collection reservoirs 84-94, the specific volumes of which are also shown. Thus, reservoir 84 (volume=40 ml) is for the collection of waste from column 1, whilst reservoir 85 (volume=40 ml) is for the collection of thorium-containing eluent, reservoir 86 (volume=20 ml) is for the collection of plutonium-containing eluent, reservoir 87 (volume=30 ml) is for the collection of neptunium-containing eluent, reservoir 88 (volume=10 ml) is for the collection of technetium-containing eluent, reservoir 89 (volume=60 ml) is for the collection of waste from column 2, reservoir 90 (volume=20 ml) is for the collection of uranium-containing eluent, reservoir 91 (volume=10 ml) is for the collection of waste from column 3, reservoir 92 (volume=20 ml) is for the collection of americium and curium-containing eluent, reservoir 93 (volume=145 ml) is for the collection of waste from column 4 and reservoir 94 (volume=50 ml) is for the collection of strontium-containing eluent.

Figures 13B, 14:
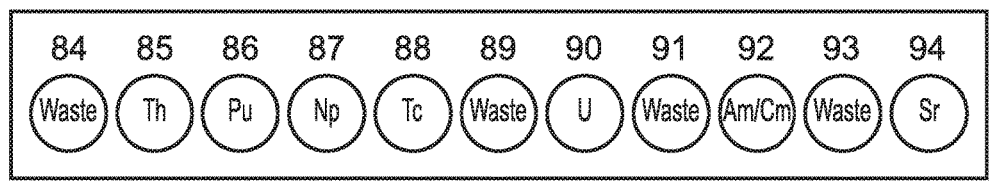
FIG. 13(b) provides a schematic illustration of the layout of collection reservoirs in the collection vessel of FIG. 13(a)
FIG. 14 illustrates a typical protocol used by an operator to perform a separation according to a method of the invention.
Figure 15:
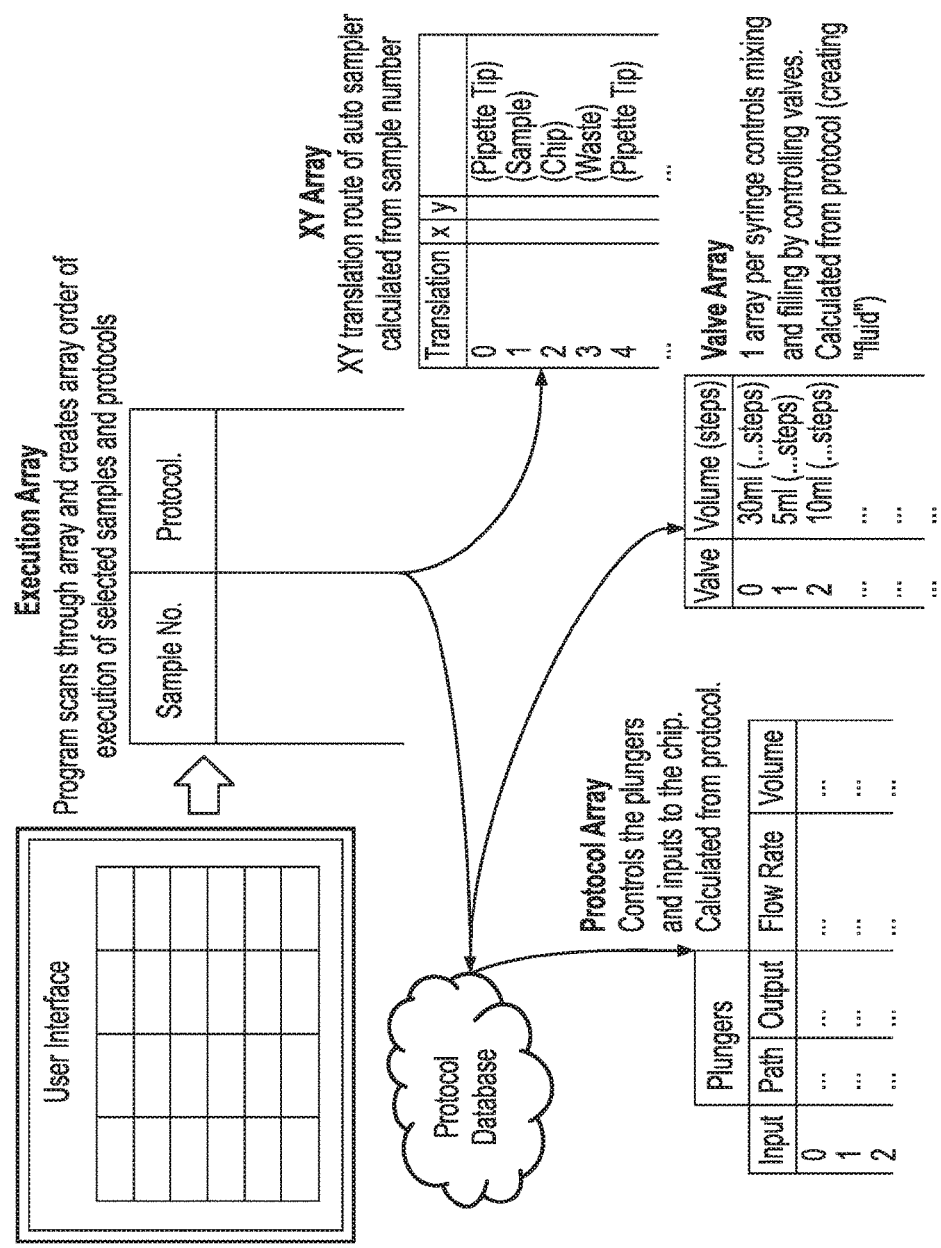
FIG. 15 provides an illustration of the screen displays viewed by a user operating the apparatus according to the invention.

Finally, FIGS. 14 and 15 provide overviews of a typical protocol used by an operator to perform a separation according to a method of the invention and of possible screen displays which may be viewed by a user when operating the apparatus according to the invention. All control and instrumentation aspects of the system are modular in approach and they each comprise low level independent drivers. High level procedural and sequential software orders commands which instruct the low level drivers and, in doing so, make the system perform specific functions and operations.

The software is organised into two modes; developer mode and user mode. In developer mode, an operator, such as a radiochemist, may create protocols which other users are then able to use (in user mode) in order to operate the system in a predefined way so as to perform a separation routine.

The protocol is basically a set of repeated commands and, in the embodiment illustrated in FIG. 14, it has a predefined template. The protocol has a name which subsequently, in the user mode, acts as a variable from which to locate and load the protocol. The entire protocol is made up of a series of repeated steps. Thus, for example, step 1 may be a system prime command, not necessarily a sample load command, so that any line could be a sample load.

In the illustrated embodiment, the "input" describes which column/syringe/flow selection valve to use, whilst the "path" configures the plungers to make the correct flow path and the "output" configures the plungers to direct the fluid to the desired collection container. The "fluid" instructs the flow selection valve (identified in input) which fluid to draw into the syringe and by what concentration, and the "volume" instructs the syringe as to how much fluid is to be drawn in (optionally compensated for system dead volumes). The "flow rate" instructs the syringe regarding the flow rate at which the fluid is to flow out to the mixing chamber (mixer) and, subsequently, to the column. All these instructions and their sequence are stored for use by the "user".

The user interface screens illustrated in FIG. 15 allow a daily user to only run predefined routines, based on the protocol database formerly created. The only additional options that the user may choose are which sample to select and what volume of that sample to load. The user may then select the protocol which they wish to run and, provided that all necessary safety checks and measures (such as loading of a cartridge and closing of all drawers on the apparatus) have been completed, then operation of the apparatus will commence.

In a specific embodiment of the invention, the cartridge is a disposable cartridge comprised of polycarbonate resin and is used for the separation of samples of radiochemical materials. The cartridge contains 4 separation columns which are required to perform the sequential separation procedure, and the resins included in the columns are, in sequence, anion exchange powder, UTEVA® resin, TRU resin and Sr resin, all of which are available from Eichrom® Technologies LLC, 1955 University Lane, Lisle, Ill. 60532, USA.

The resins are packed into the respective columns by a standard slurry packing procedure and then polycarbonate 10 μm pore frits are inserted at the end of each column in order to prevent the escape of resin. The packing density/repeatability are controlled by monitoring and controlling the flow rate, turbidity and packing back pressure during insertion of the resins. The cartridge has dimensions which are approximately 140 mm length×100 mm width×15 mm depth. The anion exchange resin column has a volume of 2.2 ml and the subsequent columns each have a volume of 0.7 ml. In operation, the sample is introduced so as to pass through each of the 4 columns, after which the isotopes contained therein are eluted by passing an elution solvent through each in turn. Hence, the 4 columns are configured to be fluidically connected in series so that a single sample injection port will purge the 4 columns.

Sample and reagent inlet ports are provided on the top of the cartridge. The cartridge comprises a single sample inlet. Fluidic coupling is achieved via a pressure fitting, wherein the sample is presented to the cartridge via a metered autosampler tip which, in operation, is held under force to the cartridge inlet in order that the fluid sample may be pumped into the cartridge. The cartridge is provided with 4 inlets for introduction of reagents and purge liquids, and the fluidic couplings are again pressure fittings.

Control of flow rates and directions is achieved by the use of in-built valves—which may comprise membrane Viton valves—which, in operation, act to couple the columns so as to allow the sample to flow through, and then decouple the columns in order that each column can be individually processed. Viton valves have a good degree of chemical compatibility with the processing reagents and are capable of withstanding the processing pressures which are encountered during operation of the apparatus.

The outlet ports are comprised on the underside of the cartridge. The cartridge contains 11 outlets comprising, in order, outlets for waste from column 1, thorium-containing eluent, plutonium-containing eluent, neptunium-containing eluent, technetium-containing eluent, waste from column 2, uranium-containing eluent, waste from column 3, americium/curium-containing eluent, waste from column 4 and strontium-containing eluent. Each outlet port has an in-moulded fluid director and the outlet ports guide the flow of eluent into the collection reservoirs. It is important that, in operation, liquid flowing from the chip does not contaminate the fixed infrastructure of the system.

The apparatus additionally incorporates a built-in or external PC and monitor, or is provided with USB and Ethernet connections in order to facilitate user interaction for configuration of the apparatus and display of experimental results.

The reagents required for extraction and elution of the sample are in the form of stored concentrates which are dynamically mixed as required, with the mixing sub-system comprising a system as depicted in FIG. 12 acting as the pumping mechanism to flow the reagents through the cartridge. The cartridge resides on a cartridge platen and the outlets of the cartridge flow down through the platen and into a disposable/removable waste and sample collection container.

Figure 8A:
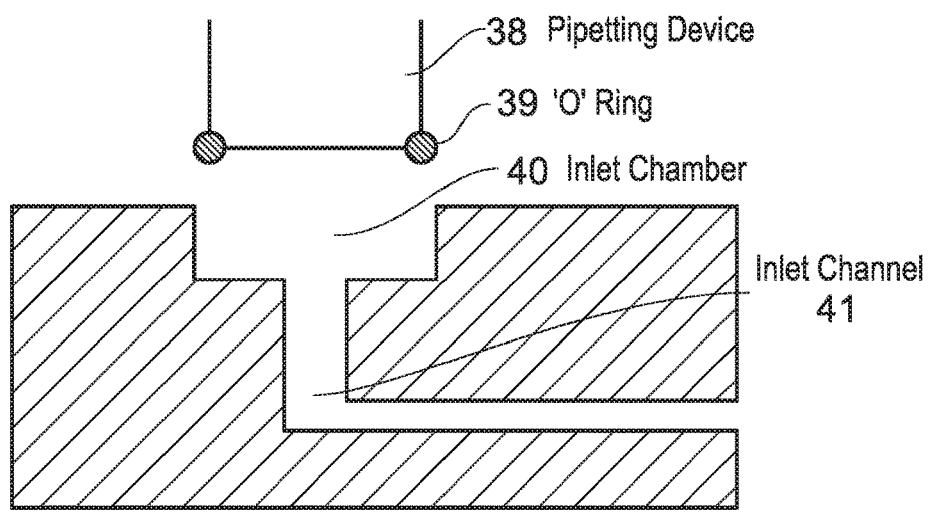
FIG. 8(a) illustrates in cross-section the sample inlet port in the upper layer of a cartridge according to the invention and a pipette prior to engagement in the port.
Figure 8B:
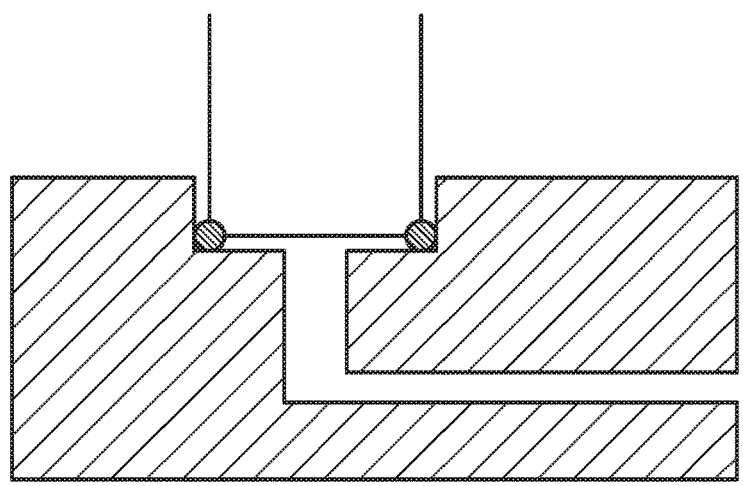
FIG. 8(b) illustrates in cross-section the sample inlet port in the upper layer of a cartridge according to the invention and a pipette engaged in the port.

In operation, a sample is introduced and pumped through the cartridge robotically by means of a custom designed autosampler as depicted in FIG. 10. The mode of introduction of the sample to the cartridge is more critical than with the reagents since, in the latter case, the risk of contamination does not arise. The autosampler is arranged such that a disposable pipette is able to co-operate with a fluidic sample container in a sample drawer as shown in FIG. 11. In certain embodiments, the autosampler automatically picks up a new pipette tip from the tip section of the sample drawer, moves across, dips into the sample and extracts a fixed volume (which only resides in the disposable part of the pipette). The autosampler arm then moves over the sample inlet on the cartridge and lowers down with force, thereby causing a fluidic pressure seal to form between the pipette "O" ring and the recessed cartridge sample inlet, as depicted in FIGS. 8(a) and 8(b). Once the fluidic connection has been, the sample is injected into the cartridge via the action of the plunger being depressed. After sample injection, the arm moves over the pipette waste container and ejects the pipette, so that the autosampler is then available to process a further sample.

The apparatus incorporates five separate reagents for use in the method of the invention. The reagents are stored in external containers or internal reservoirs in a drawer such as depicted in FIG. 2, with the individual reservoirs containing hydrochloric acid, nitric acid, oxalic acid, ammonium iodide and deionised water. The deionised water is used as a solvent, as a wash/purge, and as a diluent for the other concentrated solvents in order to facilitate the preparation of eluents of the correct concentration. By using these components a reagent mixing and pumping section such as depicted in FIG. 12 can prepare and distribute all the various washes and elutes. Specifically, in an embodiment of the invention the five specified reagents are mixed to obtain seventeen different compositions which are then used as washes and eluents.

Each of the chromatographic columns (anion exchange resin, UTEVA, TRU and SR) has a syringe pump associated with it, and each of these syringe pumps has a multi-way rotary selection valve, as illustrated in FIG. 12. This facilitates, for example, the supply of 4.5 M hydrochloric acid to the anion exchange column by pumping using a syringe pump to pull in a metered amount of hydrochloric acid and a complimentary amount of deionised water to provide the correct concentration. The valve may then be switched to output mode so that the syringe pump pushes the fluids out towards the cartridge, via the mixer, and pumping them through the cartridge until the eluents exit the cartridge through the outlet ports into the collection reservoirs. The syringe may then be switched to draw in deionised water and expel it to waste in readiness for a subsequent reagent mixture to be prepared.

In the present embodiment, the mixed reagents may be delivered into the cartridge via a delivery manifold to which the rotary selection valves are fluidically connected. The loaded cartridge is then forced up onto the underside of the manifold, thereby forming a compression fitting into each of the reagent inlets.

The cartridge is loaded on to a platen that allows it to be inserted into an apparatus as shown in FIG. 2 using a sliding mechanism. In this embodiment, the platen may also house the valve plungers for adding reagents, these plungers being designed to align with valve holes in the cartridge and being controlled in the correct sequence via suitable software. The valve activation plungers are usually spring returned and based on electromagnetic solenoids.

In operation, the eluted sample and waste fluids are collected from the output ports on the cartridge in collection reservoirs in a collection vessel which comprises an injection moulded polycarbonate vessel. The collection vessel is made up of eleven separate collection reservoirs, as depicted in FIGS. 13(*a*) and 13(*b*), each for the collection either of waste or of a sample eluent. After completion of an operational cycle, the collection vessel can be capped off and removed from the unit. The vessel may be designed such that the individual reservoirs containing samples may be separated for use in further analysis. In the same way as for the autosampler and cartridge loader, the loading and unloading of the waste and sample collection reservoirs may be automated.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An apparatus for the separation of the components of a sample of material, said apparatus comprising a cartridge comprising:
   at least one sample inlet port,
   at least one resin inlet port and
   a multiplicity of reagent and purge fluid input ports which are fluidically connected via a multiplicity of control valves to a multiplicity of chromatographic columns which are fluidically connected together in series; and
   a multiplicity of outlet ports wherein each outlet port additionally comprises an outlet valve which is adapted to control the flow of fluid through said outlet ports;
   wherein each of said multiplicity of chromatographic columns is aligned with one of said multiplicity of outlet ports so as to allow for at least a portion of the fluid flow to exit the system from said column through said outlet port,
   wherein said multiplicity of chromatographic columns are fixed in position relative to the outlet ports, and
   wherein each of the chromatographic columns comprise a different chromatographically active resin than the other chromatographic columns; and
   wherein the axis of each of said multiplicity of chromatographic columns and the multiplicity of control valvues is approximately in the same plane forming the first layer.

2. An apparatus as claimed in claim 1 wherein said outlet valves are located at the upstream end of said outlet ports.

3. An apparatus as claimed in claim 1 wherein said apparatus comprising a cartridge comprises a multiplicity of different layers.

4. An apparatus as claimed in claim 3 wherein said apparatus comprises at least a first layer and a second layer.

5. An apparatus as claimed in claim 1 wherein said apparatus comprises a cartridge comprising:
   (a) a first layer comprising:
      (i) a sample inlet port, at least one resin inlet port and a multiplicity of reagent and purge fluid input ports which are fluidically connected via a multiplicity of control valves to
      (ii) a multiplicity of chromatographic columns which are fluidically connected together in series; and
   (b) a second layer comprising a multiplicity of outlet ports wherein each outlet port additionally comprises or co-operates with an outlet valve which is adapted to control the flow of fluid through said outlet ports, wherein each of said multiplicity of chromatographic columns is aligned with one of said multiplicity of outlet ports so as to allow for fluid flow from said column through said outlet port.

6. An apparatus as claimed in claim 1 wherein the chromatographically active resins are applied to the separation of radioactive isotopes.

7. An apparatus as claimed in claim 6 wherein the chromatographically active resins are selected from ion exchange resins, resins comprising dipentyl pentylphosphonate loaded on an inert support, resins comprising octylphenyl-N,N-di-isobutyl carbamoylphosphine oxide/tri-n-butyl phosphate loaded on an inert support and resins comprising 4,4'-(5')-di-t-butylcyclohexano 18-crown-6 (crown ether)/1-octanol loaded on an inert support.

8. An apparatus as claimed in claim 7 wherein said ion exchange resins comprise anion exchange resins.

9. An apparatus as claimed in claim 1 wherein said chromatographic column includes means to prevent the escape of said resin materials from said columns, wherein said means comprises plugs of inert materials and said plugs of inert materials comprise frits.

10. An apparatus as claimed in claim 1 wherein said chromatographic columns are connected together in series by a multiplicity of control valves and the flow of fluid through the columns is controlled by said control valves.

11. An apparatus as claimed in claim 1 wherein the control valves are adapted to interconnect the chromatographic columns to allow the sample to flow through the columns and to decouple the columns such that columns may be individually processed using various reagents.

12. An apparatus as claimed in claim 1 wherein control valves are adapted to couple the inlet ports via fluidic channels to the chromatographic columns and to interconnect the chromatographic columns.

13. An apparatus as claimed in claim 1 wherein said control valves comprise membrane valves.

14. An apparatus as claimed in claim 1 wherein said outlet valves adapted to control the flow of fluid through said outlet ports comprise membrane chambers containing membranes.

15. An apparatus as claimed in claim 14 which comprises actuators which co-operate with membranes in the outlet ports so as to allow the flow of fluid through the outlet ports.

16. An apparatus as claimed in claim 1 which comprises from 2 to 40 chromatographic columns.

17. An apparatus as claimed in claim 1 which comprises 2, 3 or 4 chromatographic columns.

18. A system for the separation of the components of a sample of material, said system comprising:
(a) a cartridge as claimed in claim 1;
(b) a plurality of reagent containers;
(c) a plurality of collection reservoirs;
(d) means for the mixing of reagents and controlled transfer of reagents from reagent containers to the cartridge; and
(e) means for controlling the collection of samples from the cartridge.

19. A system as claimed in claim 18 wherein said means for the mixing of reagents and controlled transfer of reagents from reagent containers to the cartridge comprises valves controlled by software.

20. A system as claimed in claim 18 wherein said means for controlling the collection of samples from the cartridge comprise valves controlled by means of software.

21. A system as claimed in claim 18 which is applied to the separation and analysis of samples of radioactive materials.

22. A system as claimed in claim 21 wherein said chromatographic columns contain at least one chromatographically active resin selected from ion exchange resins, resins comprising dipentyl pentylphosphonate loaded on an inert support, resins comprising octylphenyl-N,N-di-isobutyl carbamoylphosphine oxide/tri-n-butyl phosphate loaded on an inert support and resins comprising 4,4'-(5')-di-t-butylcyclohexano 18-crown-6 (crown ether)/1-octanol loaded on an inert support.

23. A method for the separation of the components of a sample of material, said method comprising the steps of:
(a) inserting said sample in an apparatus as claimed in claim 1 via an inlet port;
(b) processing the sample through said apparatus; and
(c) collecting fluids from outlet ports of said apparatus.

24. A method as claimed in claim 23 which comprises the separation, or separation and analysis, of samples of radioactive materials.

25. A method as claimed in claim 23 wherein said processing comprises effecting the chromatographic separation of the sample components using reagents selected from inorganic acids, organic acids, inorganic salts and deionised water.

26. A method as claimed in claim 25 wherein said inorganic acids are selected from nitric acid and hydrochloric acid and/or said organic acid is oxalic acid and/or said inorganic salt is ammonium iodide.

27. A method as claimed in claim 24 which comprises the separation of radioactive samples to provide output streams which separately comprise components comprising thorium, plutonium, neptunium, technetium, uranium, americium/curium and strontium.

* * * * *